May 26, 1959 B. S. SAUTER 2,887,694
METHOD OF FORMING EXPANDABLE END BLIND RIVETS
Filed Jan. 29, 1954 2 Sheets-Sheet 1

BOBBIE S. SAUTER,
INVENTOR.

HUEBNER, BEEHLER,
WORREL & HERZIG,
ATTORNEYS.

BY Albert M Herzig

May 26, 1959  B. S. SAUTER  2,887,694
METHOD OF FORMING EXPANDABLE END BLIND RIVETS
Filed Jan. 29, 1954  2 Sheets-Sheet 2
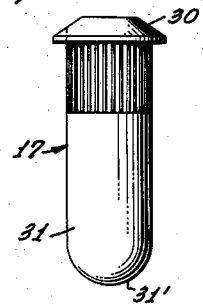
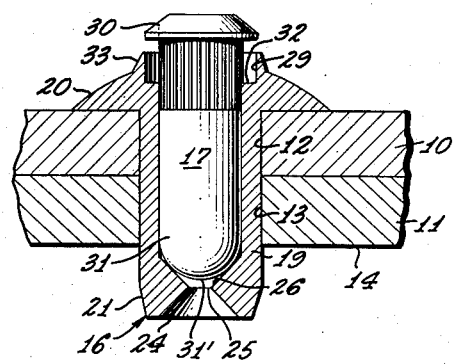
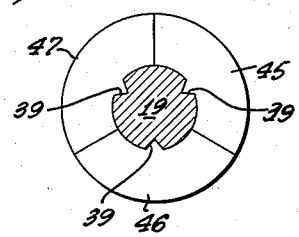
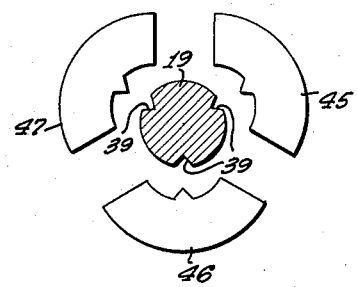
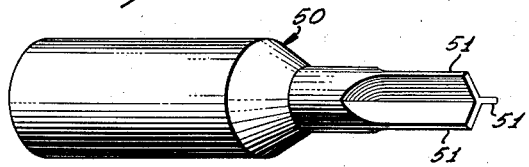
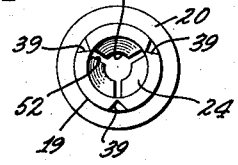
BOBBIE S. SAUTER,
INVENTOR.
HUEBNER, BEEHLER,
WORREL & HERZIG,
ATTORNEYS.
BY Albert M. Herzig United States Patent Office 2,887,694
Patented May 26, 1959

2,887,694

METHOD OF FORMING EXPANDABLE END BLIND RIVETS

Bobbie S. Sauter, Van Nuys, Calif., assignor to Deutsch Fastener Corporation, Gardena, Calif., a corporation of California Application January 29, 1954, Serial No. 407,039

3 Claims. (Cl. 10—27)

This invention relates to blind rivets and more particularly to simple methods for manufacturing such rivets as well as to the rivets so manufactured.

In the manufacture of blind rivets of the type wherein the inaccessible end of the rivet is expanded to form an inner head by manipulation of a tool in an axial bore in the rivet, it is customary to cut slots in the expanding end of the rivet to form sections which may be bent radially outwardly when setting the rivet in place. The cutting of slots in the end of the rivet to form such sections involves several relatively costly operations. This invention is directed toward simplifying the steps involved in manufacturing such rivets. Where rivets are being manufactured in large quantities, any improvement or simplification of the forming operations becomes appreciable not only in eliminating the need for complicated machinery but also to substantially reduce the number of misformed rivets which increase in proportion to the complexity of the forming operations.

It is, therefore, a primary object of this invention to simplify the operations involved in the manufacture of blind rivets and to provide a rivet which may be formed simply and yet be capable of being set in place easily.

Other objects and advantages of this invention will become apparent from the following part of this specification wherein the details thereof are set forth with reference to the accompanying drawings, in which—

Figure 7 is a view in elevation of a tool or mandrel part for the rivets of this invention.

Figure 8 is a sectional view of a rivet showing the mandrel in a position just prior to its being seated in the rivet sleeve.

Figure 9 is a plan view of a die used in an alternative method for forming the grooves in the rivets of this invention and showing the shank of the rivet in cross section.

Figure 10 is a view similar to that of Figure 9 but showing the die in expanded condition and the die pieces removed from the shank of a rivet.

Figure 11 is a perspective view of a cutting tool or punch adapted for use in manufacturing rivets according to the present invention.

Figure 12 is an end view of a rivet having internal cuts formed as with the tool shown in Figure 11.

Figure 1:
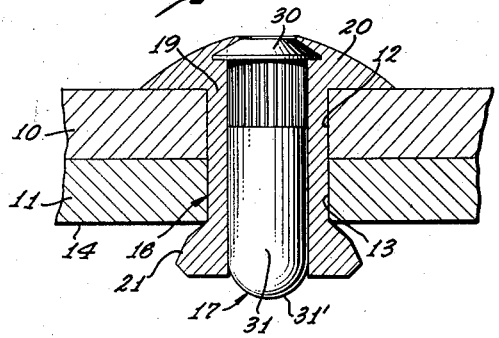
Figure 1 is a sectional view through two overlapping plates joined by a rivet formed in accordance with this invention.

Referring to the drawings, and particularly to Figure 1 thereof, numerals 10 and 11 designate two overlapping plates that are fastened together by a rivet fitted into aligned holes 12 and 13 in the plates 10 and 11, respectively. The plate 11 has an inner face 14 which, for purposes of this description, is assumed to be inaccessible, requiring the use of a fastening device that may be expanded at its inner end by a tool operated from a position on the exposed side of plate 10. The rivet illustrated in the drawings is a fastening device of the type that is expanded at its inner end by operations performed through the head of the rivet, and it comprises a sleeve part indicated generally at 16 and a tool or mandrel part 17. The sleeve 16 is formed from any suitable relatively soft and malleable metal, such as Zamac, for example, or an alloy containing, e.g., a large amount of aluminum or copper, or comprising a malleable pot metal or the like. The mandrel, however, is formed of a harder metal such as steel, for example, whereby the mandrel will expand the inner end of the sleeve without itself being deformed.

Figure 6:
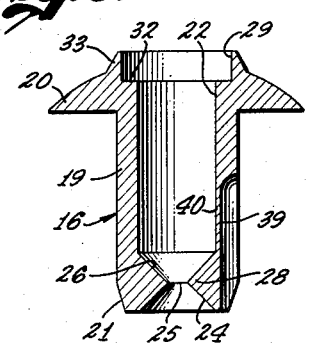
Figure 6 is a vertical sectional view of a rivet sleeve formed in accordance with this invention.

In Figure 6 the sleeve part 16 is shown alone without a mandrel being fitted therein, and this figure shows the form of the sleeve prior to its being expanded. It comprises a shank portion 19 which, in the embodiment illustrated, is cylindrical in form, and has a laterally extending flange on one end of the sleeve to form a head 20 for the rivet. That end of the sleeve which is opposite the head 20, i.e., the shank end of the rivet, is preferably bevelled, as shown at 21, or otherwise suitably chamfered or rounded off to make it easier to insert the rivet into a hole. The sleeve 16 is provided with an axial bore 22 which passes through the head 20 and extends into the shank 19, terminating short of the shank end of the rivet. A suitable dimple or countersink 24 is preferably formed in the shank end of the sleeve co-axial with the bore 22 and it may but need not communicate with the inner end of the bore 22 through a hole 25, which hole 25, if provided, has a diameter smaller than that of the bore 22. The inner end of the bore 22 is bevelled downwardly from the walls to the center of the bore or to the rim of the hole 25 to form substantially an inclined shoulder 26 which, with the oppositely inclined face 24 at the countersink, dimple or hole 25, defines an annular collar 28 in the shank end of the rivet. In the event no hole 25 extends from the optional countersink or dimple the position occupied by the opening 25 will be solid.

At the head end of the sleeve 16 the bore 25 may be cut away around its rim to provide an optional annular recess or counterbore 29 for receiving an optional head 30 of the mandrel 17.

In the event said head 30 is omitted from the mandrel, said mandrel will have a uniform diameter as indicated by dotted lines in Figs. 1, 7 and 8, but will preferably retain a chamfered or rounded outer end.

The mandrel 17 has a stem part 31 of a diameter permitting it to slide axially in the bore 22. The inner end of the mandrel is rounded or chamfered as shown at 31, or otherwise suitably beveled so as to engage the inclined shoulder 26 in the sleeve 16 and thus cause the collar 28 to expand or flare out as the mandrel is driven axially in the bore 22 and against the collar 28. Expansion or flaring out of the collar 28 forms an inner head for the rivet which contacts the face 14 of the inner plate 11 and holds the plate 11 tightly against the plate 10. The length of the mandrel 17 is such that the inner face of its head 30 will abut against a shoulder 32 formed by the annular recess 29 in the head of the rivet where such head and recess are desired. Thus when the collar 28 is fully expanded to form the inner head of the rivet, the shoulder 32 will prevent continued axial movement of the mandrel into the bore 22 of the rivet. The mandrel, even with said head and recess, is held from sliding out of the bore by means of an annular lip 33 which is peened over the outer reduced end of the head 30 of the mandrel, as is best shown in Figure 1 of the drawing.

Figure 2:
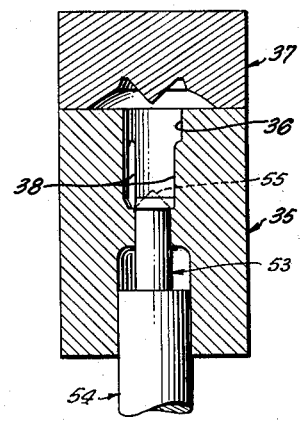
Figure 2 is a vertical section of a cavity mold or die used for forming rivets of the present invention.

Expansion of the collar 28 is made simple and efficient according to the present invention by providing axially aligned grooves in the shank end of the rivet whereby the shank end will split into sections along the grooves, flaring radially outwardly to form the inner head for the rivet. In the embodiment illustrated in Figures 2 and 3 of the drawings, such grooves are formed in the external surface of the shank at the time of forming the sleeve. The sleeve may be formed in a cavity mold or die having a base part 35 with a cavity 36 for forming the shank 19 of the rivet and a cap part 37 for forming the head 20 of the rivet. The cavity 36 is cylindrical and has a plurality of radially extending ribs 38 on the wall of the cavity for forming axially aligned grooves 39 in the external surface of the shank of the rivet. The grooves 39 are preferably formed at equally spaced apart intervals around the shank of the rivet and extend from the shank end beyond the plane of the inner shoulder 26 of the collar 28. As best shown in Figure 6, the grooves 39 are preferably deep enough to leave but a small portion of metal 40 remaining between the bottom of the groove and the wall of the bore 22 in the sleeve but they may optionally be deep enough to remove entirely the metal thereat. Thus when the sleeve is expanded by the mandrel 17 it will split along the thin portions 40 or spread the resultant fingers remaining in the wall of the sleeve, whereby the remaining section of the sleeve lying between the grooves or corresponding openings will flare out radially, as shown in Figure 1, to form the inner head of the rivet.

Figures 9 and 10 illustrate another way in which the external grooves 39 may be formed in the shank. According to the method illustrated in Figures 9 and 10 the grooves 39 are formed into the shank at a time prior to forming the bore 22, and this is accomplished by means of an annular segmental forming die which, in the embodiment illustrated, comprises three sections, 45, 46 and 47, which are radially moved and squeezed together to form the grooves 39.

Figure 11 illustrates a piercing tool 50 adapted for piercing (Fig. 12) through the collar 28 at 52. The cutting end of the tool 50 is fluted to provide cutting edges 51. The particular tool 50 illustrated in Fig. 11 is provided with three cutting edges 51 whereby it will cut the collar 28 into three circumferentially equally spaced segments. Where it is desired to form grooves 39 on the external surface of the rivet sleeve in addition to the cuts 52 in the collar 28, the cuts 52 are made to be radially aligned with the grooves 39 preferably, as above stated, leaving but a slight amount of metal or no metal between the bottom of the groove 39 and the respective aligned cuts 52 whereby forcible axial movement of the mandrel 17 splits or separates the end segments of the rivet and causes it to flare out and form an inner head for the rivet.

In sum, the preferred method of forming the rivet herein shown and described is as follows:

The die halves 35 and 37 are axially moved apart and a slug of metal, preferably in the form of a rod of the subject material, is initially inserted into the cavity 36 so as to partially or fully occupy said cavity with or without conforming to the ribs 38 therein. The slug is then, or previously, cut to a desired size and the die halves brought forcibly together to form the rivet body and head in accordance with conventional rivet heading practice.

In addition, however, the ribs 38 form the desired grooves 39 and the body is preferably also formed with a desired dimple or the like 43 by means of said suitably shaped die 37.

Figure 3:
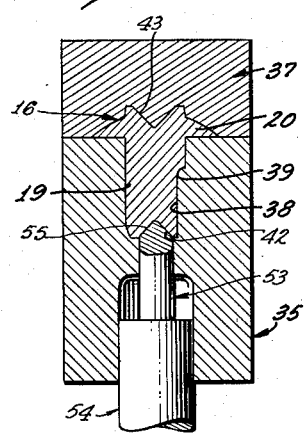
Figure 3 is a section similar to Figure 2 and showing a die cast or headed rivet body in section in the cavity of the mold or die.
Figure 4:
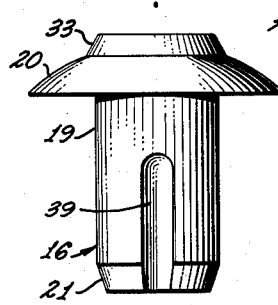
Figure 4 is an elevational view of a rivet body as taken from a mold or die.
Figure 5:
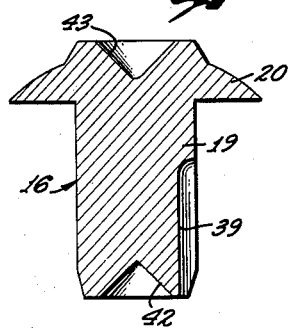
Figure 5 is a sectional view of a rivet body taken on line 5—5 of Figure 4.

A knockout pin 53 moved as on a plunger 54 has a suitably shaped end 55 which forms the dimple 42 as during the beading operation and then acts upon separation of the dies 35 and 37 to eject the rivet body, Figs. 4 or 5. The rivet body, then being in the form of Figs. 3, 4 or 5, is drilled at 22, or optionally if the body 16 is molded the bore 22 is formed during the corresponding molding operation.

In lieu of the last above described method, the grooves 39 may be formed in a rivet of conventional construction by means of the segmental compression dies, as illustrated in Figs. 9 and 10, whereupon the rivet is drilled to form the bore 22 but preferably without forming the dimple 42.

The mandrel is next inserted in either method and the completed rivet, e.g., Fig. 8, is ready for use as illustrated in Figs. 1 and 8.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

What I claim as new and desire to secure by Letters Patent is:

1. The method of cold forming an expandable and blind rivet comprising, the steps of; forcing one end and a substantial portion of a solid cylindrical blank axially into an elongated cylindrical die cavity having longitudinal ribs therein of substantially uniform cross-section and height and terminating short of the mouth of the die cavity, the bottom of the die cavity being provided with an axial conical projection, to form longitudinal grooves in the external cylindrical surface of said blank and a generally conical depression centrally in said one end while simultaneously cold forming a head on the other end of said blank externally of said die cavity, and thereafter forming an axial bore having a tapered end through said headed end of said blank toward said one end, and radially inwardly of the bottoms of said grooves to provide a relatively thin wall portion between the bore and the bottoms of said grooves, and terminating said bore short of said one end so that said tapered end thereof intersects only the inward portion of said conical depression to provide a shoulder portion adjacent the said one end of said blank.

2. The method defined in claim 1 wherein said head is formed by applying pressure to said other end of said blank to cause cold flow thereof, said pressure also forcing said blank into said die cavity.

3. The method of cold forming an expandable end blind rivet comprising the steps of: forcing one end and a substantial portion of a solid cylindrical blank axially into an elongated cylindrical die cavity having longitudinal ribs therein of substantially uniform cross-section and height and terminating short of the mouth of the die cavity, the bottom of the die cavity being provided with an axial conical projection, to form longitudinal grooves in the external cylindrical surface of said blank and a generally conical depression centrally in said one end while simultaneously cold forming a head on the other end of said blank externally of said die cavity, and thereafter forming an axial opening substantially through said headed end of said blank and said one end and intersecting said conical depression to form a shoulder adjacent said one end, said opening being radially inwardly of the bottoms of said grooves to provide a relatively thin wall portion between the bore and the bottoms of said groves.

References Cited in the file of this patent

UNITED STATES PATENTS

| | | |
|---|---|---|
| 1,840,928 | Anthony | Jan. 12, 1932 |
| 2,251,201 | Purtell | July 29, 1941 |
| 2,361,771 | Huck | Oct. 31, 1944 |
| 2,385,831 | Mullgardt | Oct. 2, 1945 |
| 2,426,422 | Torresen | Aug. 26, 1947 |
| 2,542,144 | Kearns | Feb. 20, 1951 |
| 2,569,826 | Packard | Oct. 2, 1951 |

FOREIGN PATENTS

| | | |
|---|---|---|
| 409,458 | Great Britain | May 3, 1934 |
| 601,453 | Great Britain | May 6, 1948 |